United States Patent [19]

Schönenberg

[11] Patent Number: 5,702,154
[45] Date of Patent: Dec. 30, 1997

[54] AIRLINE PASSENGER SEATS

[75] Inventor: Frank-Heinrich Schönenberg, Schwäbisch Hall Sulzdorf, Germany

[73] Assignee: Keiper Recaro GmbH & Co., Remscheid, Germany

[21] Appl. No.: 711,156

[22] Filed: Sep. 10, 1996

[30] Foreign Application Priority Data

Nov. 29, 1995 [DE] Germany ............ 195 44 486.8

[51] Int. Cl.$^6$ ............................................. A47C 15/00
[52] U.S. Cl. ................................... 297/257; 297/232
[58] Field of Search ........................... 297/284.3, 284.1, 297/232, 257, 234, 463.1, 248, 249, 452.18, 452.2; 244/118.6, 122 R

[56] References Cited

U.S. PATENT DOCUMENTS

| 5,104,065 | 4/1992 | Daharsh et al. ............ 297/257 X |
| 5,131,607 | 7/1992 | Arnold et al. ............ 244/122 R X |
| 5,588,706 | 12/1996 | Neumueller et al. ........ 297/463.1 X |

FOREIGN PATENT DOCUMENTS 43 37 938 C1   5/1995   Germany.

*Primary Examiner*—Milton Nelson, Jr.
*Attorney, Agent, or Firm*—Wigman, Cohen, Leitner & Myers, P.C.

[57] ABSTRACT

A series of vehicle seats, in particular airline passenger seats, which can be adjusted from three seats of normal width to two seats of enlarged width and vice versa, displays a coupling device through which two side parts of the seat back of the middle seat can be connected alternatively with the middle part or the seat backs of both outside seats. The coupling device connects the gear with the hand lever through a telescopically elongatable shaft only in the swinging area of a hand lever used for an adjustment between the middle position and an end position. The elongatable shaft includes a first section equipped with a spline bore hub and a second section that can be shifted axially relative to the first, which is formed on one part of its length like a spline shaft which only meshes with the spline bore hub when the gears connect.

5 Claims, 3 Drawing Sheets

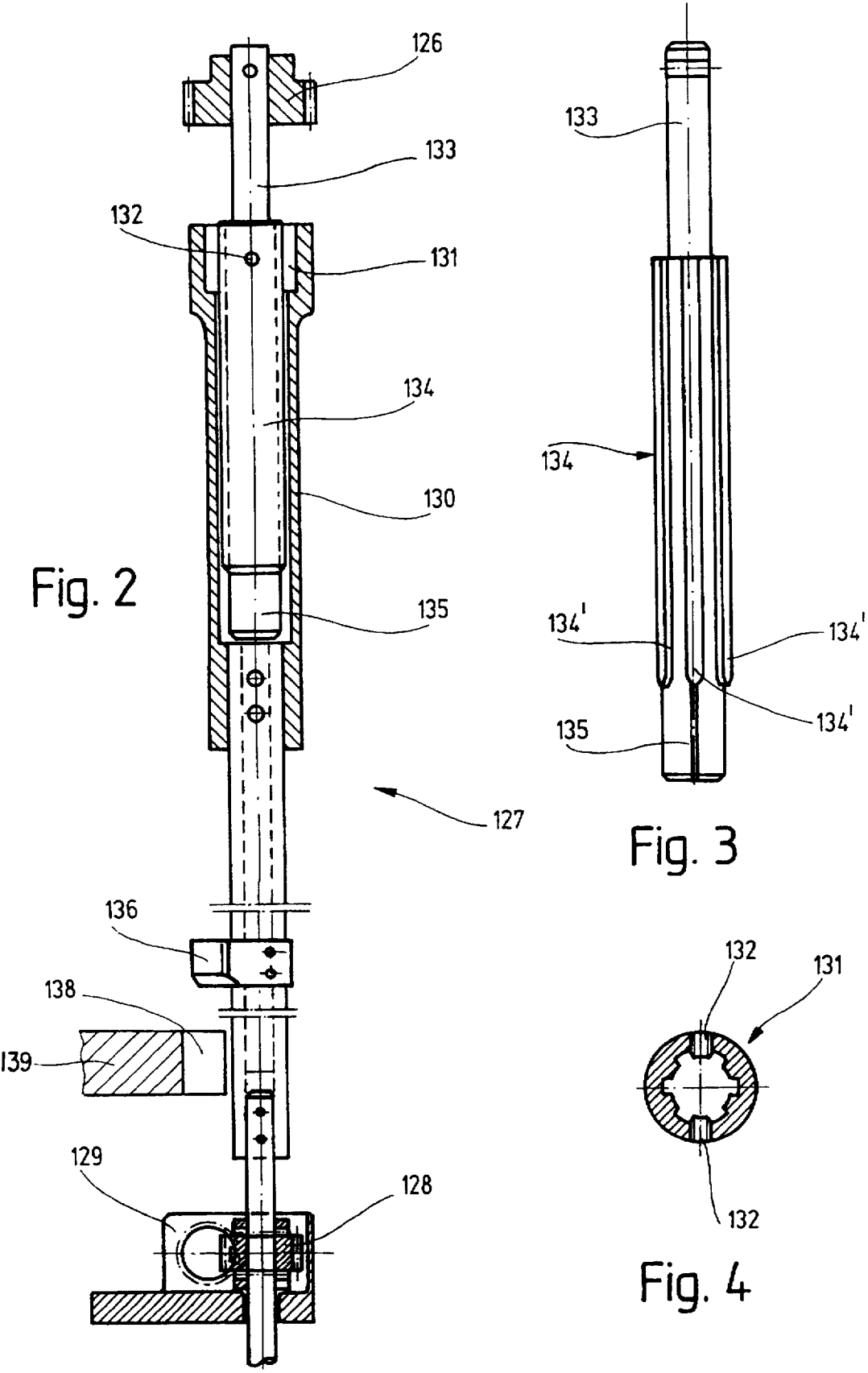

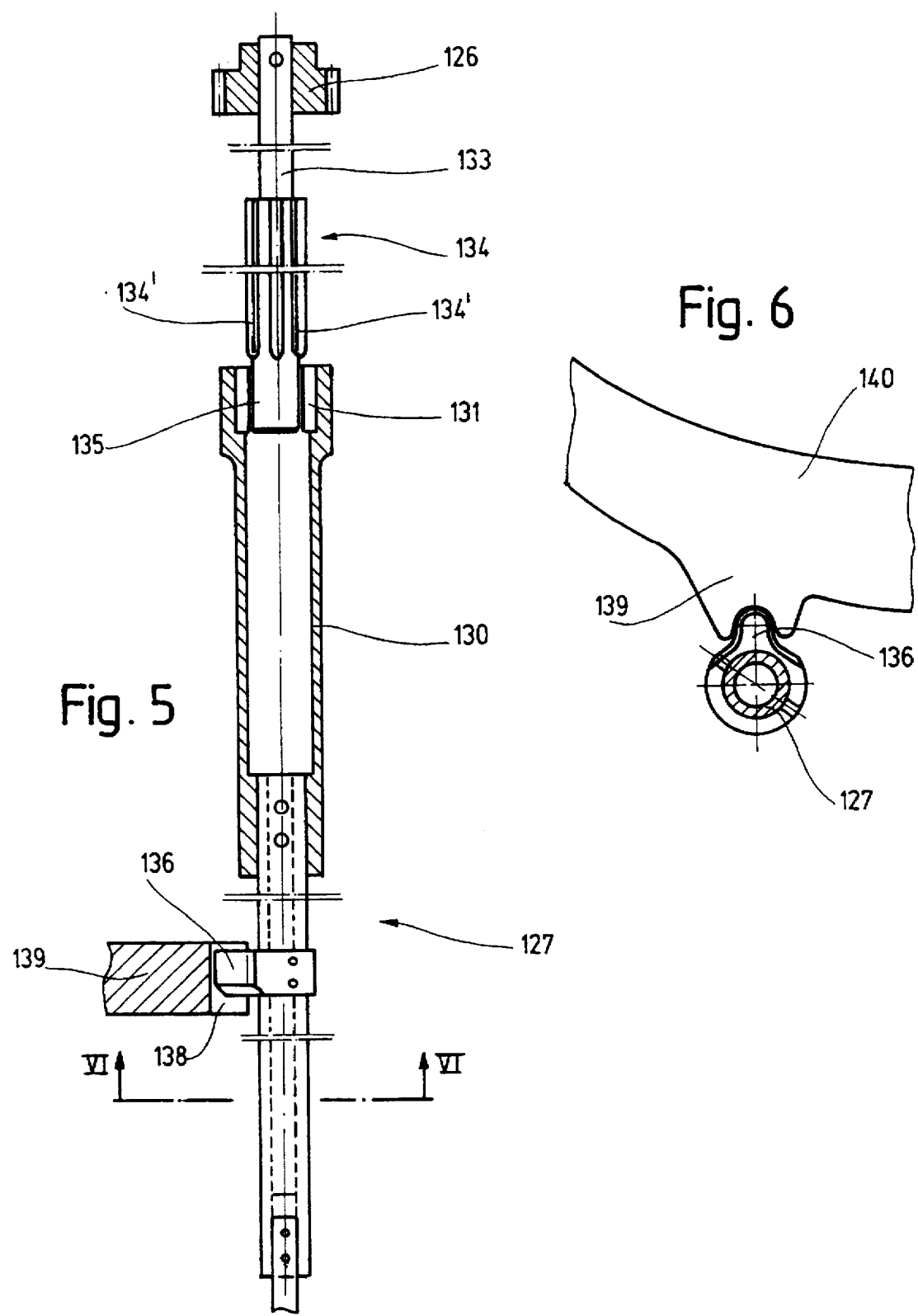

AIRLINE PASSENGER SEATS

BACKGROUND OF THE INVENTION

The invention relates to vehicle seats, and in particular, airline passenger vehicle seats.

It has been suggested that, for a series of airline passenger seats, a coupling device, through which both side parts of the seat back of the middle seat can be connected alternatively with the associated middle part, or with the seat backs of both of the outside seats, is operated through (a) a telescopically extendable shaft running parallel to the back cross spar of the series of passenger seats and (b) a toothed wheel that is connected to it, resistant to rotation, and attached to a toothed wheel set up firmly on the shaft of the hand lever. The latter toothed wheel is only interlocked with a part of its circumference so that the coupling device can only be operated when the hand lever is moved from a middle position into a end position or out of that position back into the middle position.

The use of such a toothed wheel that is interlocked with only a part of its circumference, results in a situation in which the first tooth of the toothed wheel of the telescopically extendable shaft causes the shaft not to rotate. This and other disadvantageous of previous devices are solved by the present invention, as will be described hereinafter.

SUMMARY OF THE INVENTION

According to the present invention, the telescopically elongatable shaft has a first section with a spline bore hub and a second section with a spline shaft that can be intermeshed with or disengaged from the spline bore hub. The actuation of the elongatable shaft occurs by means of two toothed wheels (or gears), which are interlocked over their entire circumference and which mesh with each other in every swivel position of the hand lever. Between the spine bore hub and the spline shaft there cannot be blockage preventing the insertion of the spline shaft into the spline bore hub. If the longitudinal ribs of the spline shaft miss one of the grooves of the spline bore hub, the turning motion conveyed to the toothed wheel of the shaft leads to a twisting of the spline shaft with respect to the spline bore hub. Both can mesh with each other as soon as the longitudinal ribs of the spline shaft are aligned with the grooves of the spline bore hub.

In preferred form of the invention the longitudinal ribs of the spline shaft have a wedge profile with its width decreasing towards the front side on the end to be inserted in the spline bore hub. A turning motion of the spline shaft and spline bore hub with respect to one another before both can become meshed with each other is only necessary in rare cases because the longitudinal ribs no longer need to be exactly aligned with the longitudinal slots of the spline bore hub in order to be intermeshed.

Preferably, an end area designed as a smooth cylinder will lock itself into the spline shaft and will at least intermesh with the spline bore hub when the spline shaft is disengaged. In so doing, the spline shaft and the spline bore hub are guaranteed, through simple means, to constantly align with one another.

BRIEF DESCRIPTION OF THE DRAWINGS

In the drawings the invention is illustrated in detail, wherein:

FIG. 2 shows an incomplete longitudinal section of the shaft whose length can be changed in the case of a setting with two seats of enlarged width;

FIG. 3 shows a longitudinal view of the spline bore hub shown in FIG. 2;

FIG. 4 shows a cross-sectional view of the second section of the shaft whose length can be changed;

FIG. 5 shows an incomplete longitudinal section of the shaft whose length can be changed in the case of a setting with three seats of normal width; and FIG. 6 shows a cross-section taken along the line VI—VI of FIG. 5.

DETAILED DESCRIPTION OF THE PREFERRED EMBODIMENT

Figure 1:
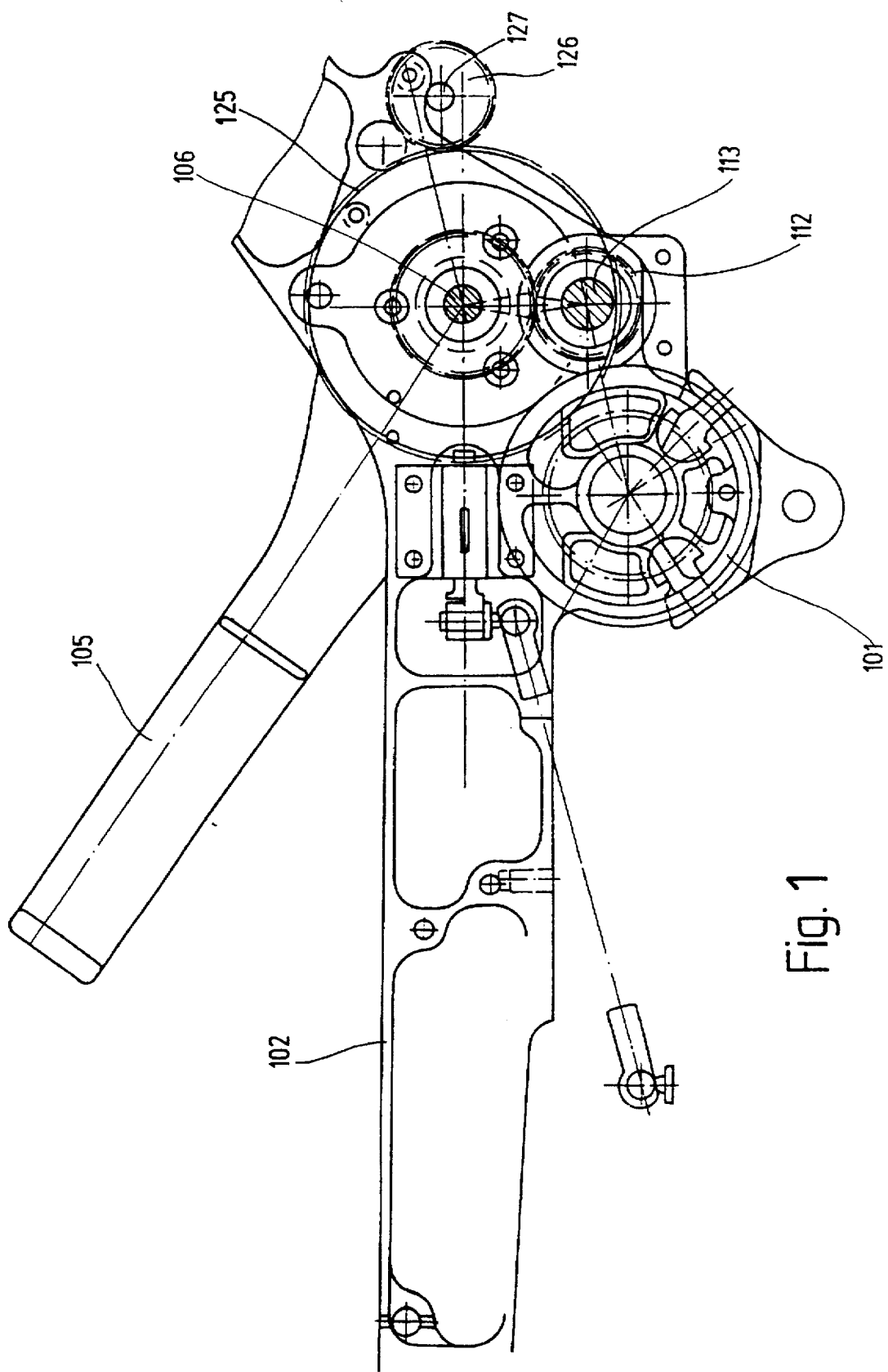
FIG. 1 shows an incomplete plan view of the inner side of the seat divider containing the swinging lever with the covering removed.

An airline passenger seat, whose position can be changed from two seats of enlarged width to three seats of normal width and vice versa, includes two transverse spars which are parallel to one another. Only the rear transverse spar 101 is illustrated in the drawing. Both transverse spars are firmly connected to non-illustrated feet. The transverse spars hold the seats arranged next to one another. The seat backs are connected to the horizontal dividers so they are able to swing and extend diagonally from the front to the rear transverse spar 101 and beyond towards the rear and up to the connecting position with the seat back. The seat back of the middle seat is divided into a middle part and two side parts. The latter is firmly connected by means of a coupling device alternatively with the middle part or with the seat back of one or the other outside seats. In the case where the seat backs are connected with both outside seats, two seats of enlarged width are available. In this connection, the two side parts of the seat back of the middle seat lie without a gap between them on the middle part of this back seat and on the seat backs of both outside seats. In this setting, the series of seats has a minimal width, as measured lengthwise from the transverse spars. If, however, both side parts of the back seats of the middle seat are connected to the middle part so that three seats of normal width are available, a space exists between each of the seat backs. The series of seats in this setting has its maximal width. Both in the setting with two seats of enlarged width and in the setting with three seats of normal width, the incline of the seat back of each seat can be chosen as desired independent of the rest of the seats.

The adjustment of the series of seats from two seats of enlarged width to three seats of normal width and vice versa occurs from the aisle end of the series of seats. The seat divider 102 provided on this end of the series of seats has a hand lever 105, which lies open in a snap ring groove type of recession of the outside covering of the seat piece and which can be grasped there for a swinging motion. The hand lever 105 is firmly placed on a shaft 106, which is positioned so it can turn in the seat divider 102 and which extends parallel to the longitudinal axis of the rear transverse spar 101.

Before the three seats of normal width can be adjusted to two seats of enlarged width, the hand lever 105 is first swung from its one end position. In a preferred embodiment the lever 105 is parallel to the seat divider 102 in the intermediate position as shown in FIG. 1. It must be swung counterclockwise about 30° when looking from the aisle towards the series of seats. This is done in order to release a locking device (not shown), which, in closed position, prevents the seat dividers from moving lengthwise from the transverse spars with respect to the seat frame, with the seat frame. The actuation of the locking device, occurs through a toothed wheel located on a shaft 106 next to the inner side of the seat divider 102, a toothed wheel 112 meshed with it, and a shaft 113 on which the toothed wheel 112 is firmly placed and which is positioned parallel to the rear transverse spar 101 in the seat divider 102, and a divider (not shown).

To actuate the coupling device, which connects both side parts of the seat back of the middle seat with the seat backs of both outside seats form-fit in the case of a setting with two seats of enlarged width and which connects both side parts of the seat back of the middle seat with the middle part of the seat back in the case of three seats of normal width, a toothed wheel 125 positioned between the hand lever 105 and the seat part 102 is constantly intermeshed with the toothed wheel 126. The latter is connected to a second section of a shaft 127 whose length can be changed telescopically and which extends parallel to the rear transverse spar 101 and is positioned, on the one hand, in the seat divider 102, and on the other hand, in the next seat divider (not illustrated). On the first section of the shaft 127 toothed wheels 128 through which the actuation of the coupling device occurs are firmly placed. In FIG. 2, only one of these toothed wheels 128 and one casing 129 that houses it, which is firmly embedded in the not illustrated neighboring seat part, are represented. The first section of the shaft 127 with the toothed wheels 128 consists of several parts. The end part 130, which cooperates with the second section, is cylindrical and hollow. Into its end section that is turned towards the toothed wheel 126, a spline bore hub 131 is inserted, which is connected firmly with the end part by means of two threaded pins 132.

FIG. 3 shows the profile of the wedge-shaped groove of the spline bore hub 131. The inner diameter of the end part 130 in the middle part between the end section that houses the spline bore hub 131 and the other end section is a little larger than the inner diameter of the spline bore hub 131 in the area of grooves lying over one another.

As especially shown in FIG. 3, the second section of the shaft 127 displays a first end section 133, which is positioned so it can turn in the seat divider 102 and is firmly connected with the toothed wheel 126. Shaft 127 has a middle section adjacent the first end section 133, in the form of a spline shaft 134 with a profile that corresponds to the inner profile of the spline bore hub 13 1 (see FIG. 4). The longitudinal ribs 134' of the spline shaft 134 terminate at the second connecting end section 135.

The second connecting end section 135 of shaft 127 has a spline shaft 134 and is constantly intermeshed with the end part 130. Its outside diameter is matched to the inner diameter of the spline bore hub 131 in the area of two longitudinal ribs that lie across from one another so that both sections of the shaft 127 will be placed coaxial to one another if the spline shaft 134 is not intermeshed with the spline bore hub 131.

Due to the fact that the series of seats displays its minimal width when the series of seats forms two seats of enlarged width, the seat divider 102 also has the smallest possible distance from the next seat divider. For this reason, the spline shaft 134 is completely engaged in the end part 130 in this setting, as is shown in FIG. 2. When the hand lever 105 is then swung out of the vertical end position into the intermediate position shown in FIG. 1, the turning of the shaft 127 causes the coupling device to release the connection between the side parts of the seat back of the middle seat and the seat backs of the outside seat and to make a connection with the middle part of the seat back of the middle seat. When the hand lever 105 reaches the intermediate position, the width of the series of seats can be enlarged by pushing or pulling the aisle-side seat part 102 toward the aisle. While shifting, the spline shaft 134 is completely pulled out of the end part 130. Only the second end section 135 remains intermeshed in the spline bore hub 131, as shown in FIG. 5. A swinging motion of the hand lever 105 into the horizontal end position leads to a locking of the three seats of normal width with the seat frame.

If the series of seats is to be changed again to two seats of enlarged width, the hand lever 105 must first be swung into the intermediate position so the movable seat divider can be unlocked and pushed into the end position for two seats of enlarged width. This shifting, however, is only possible when the longitudinal ribs 134' of the spline shaft 134 are aligned within the grooves of the spline bore hub 131.

To guarantee this alignment, a cam 136 is placed firmly onto the first section of the shaft 127, such that, with an adjustment to three seats of normal width, there is little backlash between the cam 136 and the groove 138, of material part 139 which engages one of the movable seat dividers 140, as shown in FIGS. 5 and 6. When the shaft 127 is extended at the time the two seats of enlarged width are changed to three seats of normal width, whereby the spline shaft 134 is pulled out of the spline bore hub 131, the adjustable seat divider 140, and with it the groove 138, come closer to cam 136. Thus, cam 136 enters groove 138 shortly before the spline bore hub 131 is completely withdrawn from the spline shaft 134. For this reason the first part of the shaft 127, and the end part 130 with it, are attached in this rotary position before the second part of the shaft 127, and with it the spline shaft 134, are turned by means of a hand lever 105 in the angular position corresponding to its horizontal end position. When the hand lever is then, swung into its intermediate position again for the adjustment to the two seats of enlarged width, the spline shaft 134 returns to the angular position in which its longitudinal ribs 134' are aligned with the grooves of the spline shaft 134. Thus, a misalignment in the groove 138 caused by the backlash of the cam 136 due to the wedge-shaped ends of the longitudinal ribs 134' of the spline shaft 134 does not prevent the spine bore hub 131 from being pushed open. Blocking of this opening up motion of the spline bore hub 131 on the spline shaft 131 caused by the longitudinal ribs 134' being aligned with the longitudinal ribs of the spline bore hub 131 is eliminated due to the fact that the first part of the shaft 127 is fastened during the separation of the spline shaft 134.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A series of passenger seats which have a seat frame common to all seats where at least one seat can be pushed lengthwise in relation to a neighboring seat between two positions in which the series of seats displays a maximum and minimum width and, in these positions, can be locked connected to a seat frame, comprising:

a lever movable in different swinging positions located at one end of seat dividers which separate individual seats, for locking or releasing said seats when the series of seats is adjusted to its minimal or maximum width;

an elongated shaft having a first section with a spline bore hub, and a second section which can shift axially in relation to the first section, said second section including a spline which meshes with said spline bore hub when connected;

a coupling device which connects the lever with said shaft; and whereby in the case of a transformation of three seats of normal width into two seats of enlarged width and vice versa, two side parts of seat backs of a middle seat can be connected alternatively with a middle part or with the seat backs of both outside seats.

2. A series of passenger seats according to claim 1, wherein said shaft includes wedge shaped longitudinal ribs for engaging said spline bore hub.

3. A series of passenger seats according to claim 1, wherein said shaft second section includes a smooth cylinder for receiving the first section.

4. A series of passenger seats according to claim 1, further including a first toothed wheel connected to said shaft, a second toothed wheel operatively connected to said lever, whereby said first and second toothed wheels intermesh when actuated by said lever.

5. A series of passenger seats according to claim 1, further including a swivel lock for a section of the shaft whose length can be changed and pushed in axial direction whereby during extension of the shaft, the shaft holds this section firmly in an angular position in which a rotation-resistant connection of the two sections of the shaft is released.

* * * * *